(No Model.) 3 Sheets—Sheet 1.
J. A. WEBBER.
COMBINED CULTIVATOR AND HARROW.
No. 601,743. Patented Apr. 5, 1898.
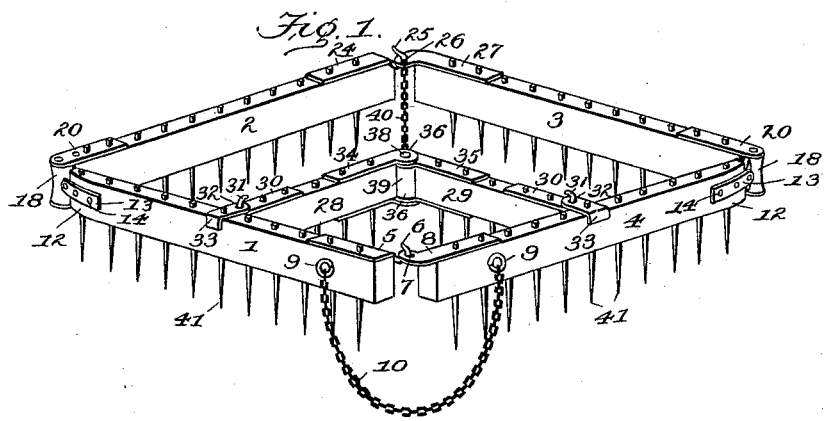
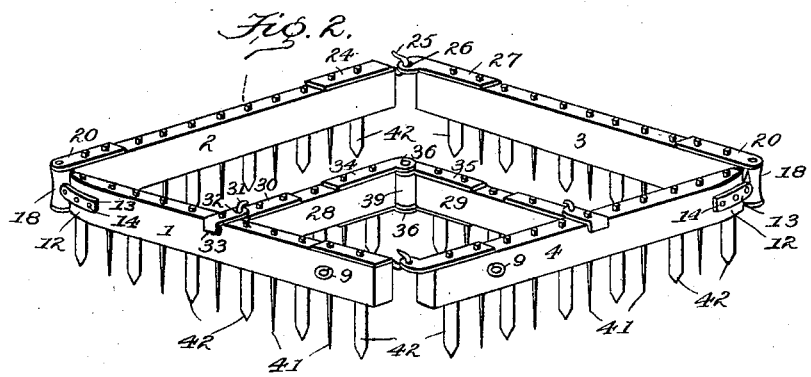
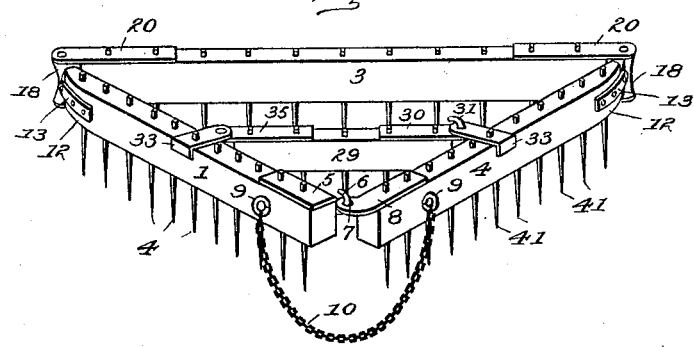
WITNESSES:
Edwin L. Bradford
R. H. McPherson Jr.
INVENTOR
Joseph A. Webber
BY
R. S. & A. S. Lacey
ATTORNEYS.

(No Model.)   
J. A. WEBBER.  
COMBINED CULTIVATOR AND HARROW.  
No. 601,743. Patented Apr. 5, 1898.
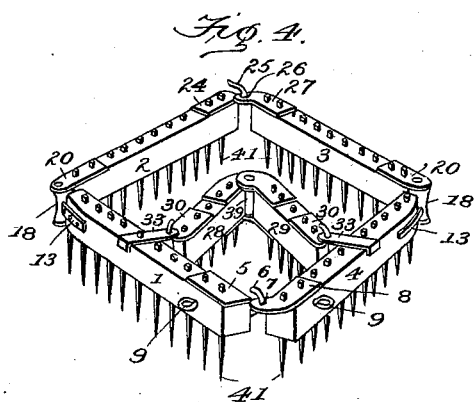
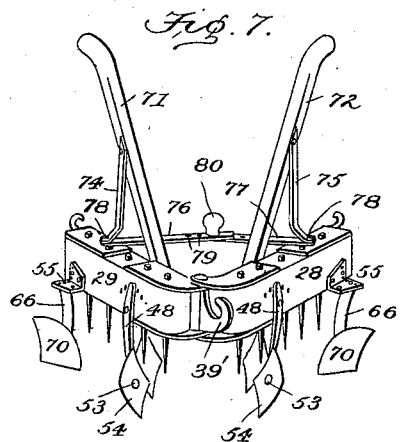
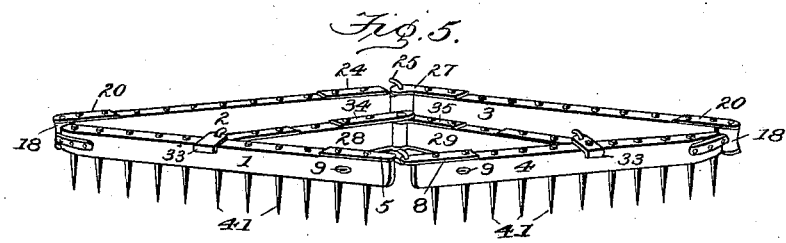
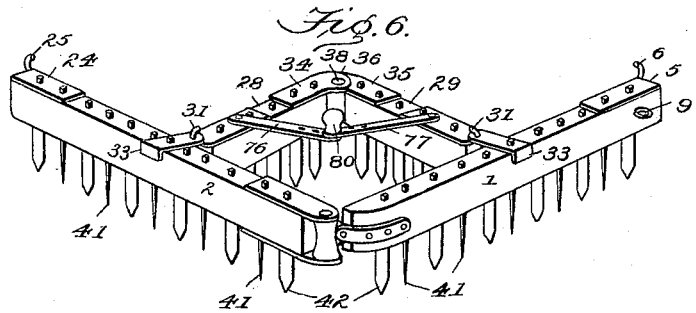
WITNESSES:
Edwin L. Bradford
INVENTOR
Joseph A. Webber
BY
ATTORNEYS (No Model.)  3 Sheets—Sheet 3.
J. A. WEBBER.
COMBINED CULTIVATOR AND HARROW.
No. 601,743.  Patented Apr. 5, 1898.
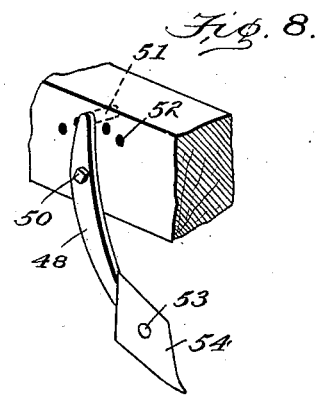
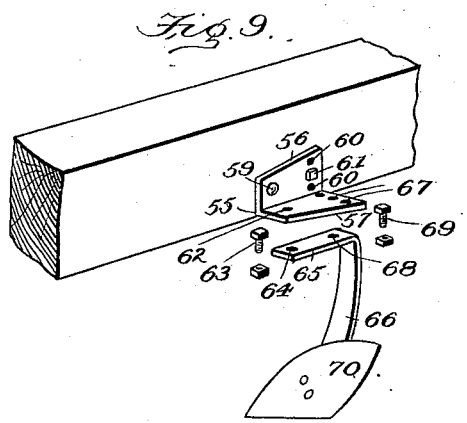
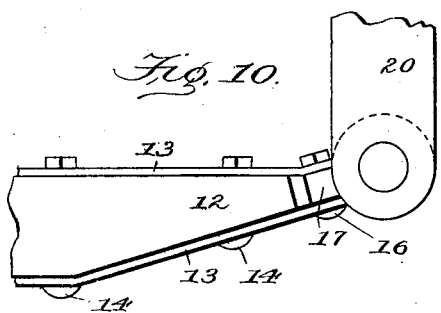
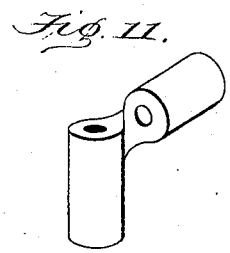
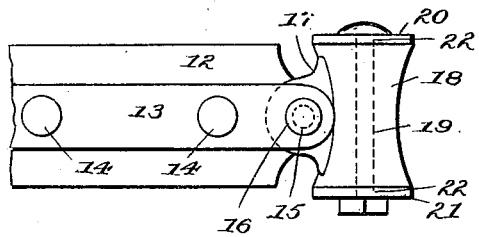
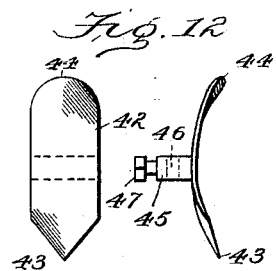
WITNESSES:
Edwin L. Bradford
R. H. McPherson Jr.
INVENTOR
Joseph A. Webber
BY
R. S. & A. B. Lacey,
ATTORNEYS.

UNITED STATES PATENT OFFICE.

JOSEPH A. WEBBER, OF VANCOUVER, WASHINGTON.

COMBINED CULTIVATOR AND HARROW.

SPECIFICATION forming part of Letters Patent No. 601,743, dated April 5, 1898.

Application filed March 17, 1897. Serial No. 627,965. (No model.)

*To all whom it may concern:*

Be it known that I, JOSEPH A. WEBBER, a citizen of the United States, residing at Vancouver, in the county of Clarke and State of Washington, have invented certain new and useful Improvements in a Combined Cultivator and Harrow; and I do hereby declare the following to be a full, clear, and exact description of the invention, such as will enable others skilled in the art to which it appertains to make and use the same.

My invention has relation to combined cultivators and harrows; and the object is to provide a simple, durable, and convenient device for effectually cultivating plowed ground; and to this end the novelty consists in the construction, combination, and arrangement of the several parts of the same, as will be hereinafter more fully described, and particularly pointed out in the claims.

In the accompanying drawings the same reference characters indicate the same parts of the invention.

Figure 1 is a perspective view of my combined cultivator and harrow. Fig. 2 is a similar view of the implement arranged as a simple drag-harrow. Fig. 3 shows it arranged as an A-harrow. Fig. 4 shows the parts assembled as a diamond-shaped harrow. Fig. 5 shows the manner of adjusting the harrow to cultivate a wide swath. Fig. 6 represents the parts assembled to form a cultivator and drag-harrow combined. Fig. 7 shows the implement assembled as a walking-cultivator. Fig. 8 is a detail perspective view showing the manner of securing the detachable adjustable shovel-point standards to the harrow-frame. Fig. 9 is a similar view showing the manner of securing and adjusting the moldboards shown in Fig. 7 to the frame. Fig. 10 is a detail of the universal joint connecting the ends of the beams forming the harrow-frame. Fig. 11 is a modified form of hinge-joint used in connecting the ends of the beams to permit one section to be turned or folded over parallel with and rest on top of the opposite section. Fig. 12 is a detached perspective view of one of the cultivator shovel-points.

1, 2, 3, and 4 represent rectangular beams of equal length which form the collapsible frame of the implement. The forward end of the beam 1 is provided with a plate 5, terminating in a hook 6, which detachably engages an eye 7 in a plate 8, secured to the contiguous end of the beam 4 to form an approximately universal joint between the two beams.

9 9 represent eyebolts secured in the beams 1 and 4, to which the opposite ends of the chain 10 are attached and by means of which the harrow is drawn. The sides of the opposite or diverging ends 12 of the beams 1 and 4 taper to a blunt point, and these tapering sides are provided with straps 13 13, secured thereto by bolts 14, passing transversely through the straps and the ends of the beams, and the outer parallel ends of said straps are provided with transverse alined orifices 15, which receive a bolt 16, passing through a similar orifice in the integral vertical lug 17 of the cylindrical hub 18, the said lug extending between the straps and forming a vertical hinge at this point.

The cylindrical hub 18 is formed with a vertical orifice 19, and the projecting parallel ends of the plates 20 21, secured on the top and bottom of the contiguous ends of the beams 3 and 4, encompass the top and bottom parallel plane faces of the hub 18, their alined orifices 22 registering with the orifice 19 in the hub, and 23 represents said orifices in the plates and hub to form a horizontal hinge-joint between the hubs and the contiguous ends of the beams.

24 represents a plate secured to the upper edge of the rear end of the beam 2 and terminating in a hook 25, which engages an orifice 26 in the plate 27, fixed to the contiguous end of the converging beam 3, and forms a swivel-joint between the two beams.

From this description it will be seen that each beam is permitted to conform to the inequalities of the ground independently of the others.

28 and 29 represent short beams, their outer ends provided with plates 30, terminating in integral hooks 31, which engage orifices 32 in the straps 33, secured about midway of the beams 1 and 4. The rear converging ends of these short beams 28 and 29 are each provided with plates 34 and 35, having projecting parallel overlapping ears 36 36, provided with vertical alined orifices 37, which receive a bolt 38, forming a hinge-joint between the said beams.

39 represents a vertical sleeve encompassing the bolt 38 between the ears 36, and it is formed with a horizontal projecting hook 39'. A coupling-chain 40 has one end secured to the hook 39', and the links on the other end may be adjustably secured to the hook 25 on the beam 2, and by increasing or diminishing the length of the chain the side beams 1 2 and 3 4 can be adjusted to cover a greater or less swath, as shown in Figs. 1, 2, 4, and 5.

41 41 represent a series of rectangular harrow-teeth vertically secured to the frame, the projecting ends of the teeth penetrating the soil and are drawn in a direction parallel to their diagonal angles, and said teeth are so arranged that those on the rear section split the balks between the furrows left by the teeth of the preceding section, so that the lines marked by the teeth in the soil shall be parallel and equidistant.

42 represents the reversible cultivator-blade formed with a rearwardly-beveled diamond-pointed end 43 and an oppositely-disposed rearwardly-beveled semicircular end 44. 45 represents an integral rearwardly-extending horizontal bracket provided with a vertical orifice 46, and a horizontal set-screw 47, communicating with said orifice, permits the vertical adjustment of said blade on the harrow-teeth 41, with either the diamond-pointed end 43 or the semicircular end 44 projecting downward, according to the nature of the ground and the work to be performed. In Fig. 6 I have shown these reversible cultivator-blades secured to the alternate teeth.

Referring to the walking-cultivator shown in Fig. 7, 48 represents a forwardly-curved standard formed with a transverse orifice 49, through which a bolt 50 passes to secure the standard to the side of the beam, as shown, and the upper end of said standard is turned inwardly and laterally to form a rigid arm 51, which is adapted to engage one of the orifices 52 in the contiguous side of the beam to secure said standard rigidly in place. The lower end of the standard has secured to it by a countersunk head-bolt 53 the diamond-shaped reversible shovel-point 54.

55 represents an angle-bracket formed with a vertical wing 56 and an integral horizontal wing 57, the forward end of the wing 56 having an orifice 58, through which a pivot-bolt 59 passes to secure it to the side of the beam, and its rear end is provided with a series of orifices 60, concentrically arranged with reference to the bolt 59 and which are adapted to receive a bolt 61 to adjustably secure said bracket to the beam. The horizontal wing 57 of said bracket is formed with a vertical orifice 62, through which the pivot-bolt 63 passes, and through an alined orifice 64 in the horizontal arm 65 of the plow-standard 66, and the rear end of said wing is formed with a series of orifices 67, arranged concentric with the pivot-bolt 63 and register with a single orifice 68 in the rear end of the standard-arm 66. A bolt 69, passing through said alined orifice in the wing and standard-arm, serves to secure the same in whatever position the standard may be adjusted.

The lower forwardly-projecting end of the standard 66 is provided with the usual share and moldboard 70, and it will be seen that the inclination and depth of soil penetration of this point may be regulated by the bolt 59 to give more or less rake, as required.

71 72 represent detachable plow-handles, pivoted at their forward ends to the beams by bolts 73, and 74 75 are vertical braces connecting the handles to the beams.

76 77 represent horizontal straps, the outer ends of which are detachably secured to the top of the beams under the bolt-head 78, which secure the vertical braces 74 75 in place. The inner contiguous ends of these straps 76 77 overlap and are provided with a series of orifices 79, through which a thumb-screw 80 passes to rigidly secure them together and at the same time regulate or adjust the angle of convergence of the beams and secure them in the position to which they may be adjusted.

Various modifications and adjustments of my harrow-cultivator will readily suggest themselves to those skilled in the art—as, for example, by means of the joint shown in Fig. 11 the rear section of the frame may be turned over on the front section when necessary—and although I have shown a particular means of carrying out my invention I do not desire to be confined to the same, as I may desire to avail myself of equivalent features.

Having thus fully described my invention, what I claim as new and useful, and desire to secure by Letters Patent of the United States, is—

1. The beams 1, 2, 3, and 4, provided with a series of vertical parallel teeth and having their contiguous ends detachably hinged together, in combination with the intermediate beams 28 and 29, provided with a series of vertical parallel harrow-teeth, and having their outer ends detachably secured to said beams 1 and 4 and their rear converging ends hinged together and provided with a projecting hook 39, and the adjustable coupling-chain 40, connecting said hook with the contiguous ends of the main beams 2 and 3, substantially as shown and described.

2. A harrow comprising a horizontal frame, the angle-bracket 56 pivoted thereto by the bolt 59 and provided with the orifices 60, 62 and 67 in combination with the bolt 61, the standard 66, provided with the orifices 64 and 68 and the sleeve 70 and the bolts 63 and 69 adapted to adjustably secure said standard to said angle-plate, substantially as shown and described.

In testimony whereof I affix my signature in presence of two witnesses.

JOSEPH A. WEBBER.

Witnesses:
JOHN O'KEANE,
JAS. J. O'KEANE.